(No Model.)

S. W. RAVENEL.
HOSE COUPLING.

No. 409,066. Patented Aug. 13, 1889.

Witnesses:
James F. DuHamel.
Horace A. Dodge.

Inventor:
Samuel W. Ravenel,
by Dodge Sons,
Attys.

UNITED STATES PATENT OFFICE.

SAMUEL WILSON RAVENEL, OF BOONVILLE, MISSOURI.

HOSE-COUPLING.

SPECIFICATION forming part of Letters Patent No. 409,066, dated August 13, 1889.

Application filed October 26, 1888. Serial No. 289,225. (No model.)

*To all whom it may concern:*

Be it known that I, SAMUEL WILSON RAVENEL, of Boonville, in the county of Cooper and State of Missouri, have invented certain new and useful Improvements in Hose-Couplings, of which the following is a specification.

My invention relates to an improvement in couplings designed more particularly for use with hose; and it consists in a novel construction of the same, as hereinafter fully set forth and claimed, whereby a tight joint is secured, the cost of manufacture reduced, and the separation and loss of the parts prevented.

The invention comprises an internal pipe upon which the ends of the hose are placed, external plates having inclines on their outer faces, and rings encircling the plates.

The invention further comprises various other features and details, hereinafter more specifically referred to.

Figure 1:
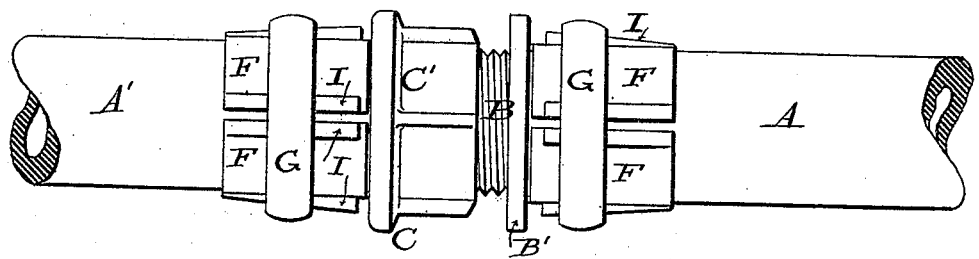
Figure 2:
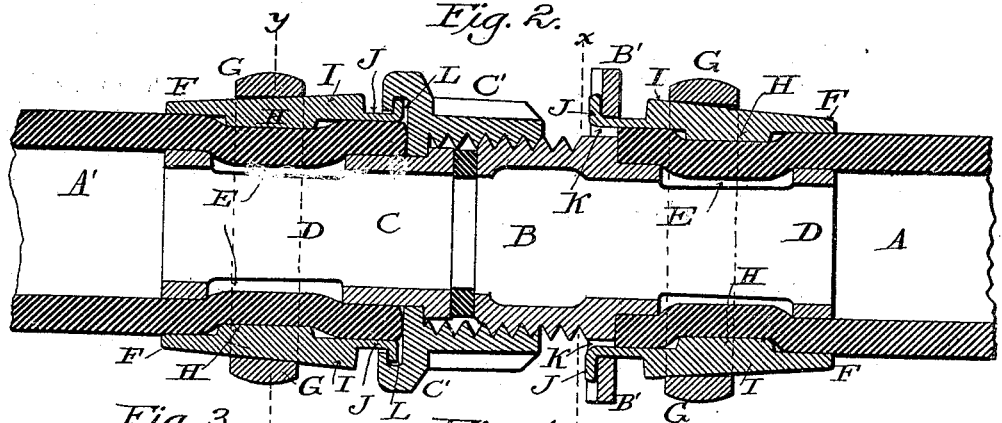
Figure 3:
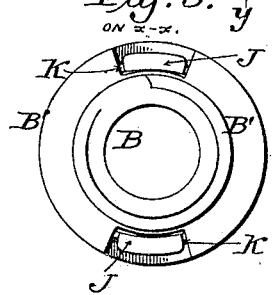

In the drawings, Figure 1 is a side view of my invention as an ordinary hose-coupling; Fig. 2, a longitudinal sectional view of the same; Fig. 3, a sectional view on the line $xx$;
Fig. 4, a sectional view on the line $yy$; Fig. 5, a perspective view of one the plates, and Fig. 6 a view illustrating a slight modification.

A A' indicate the hose-sections to be joined, one section being connected or provided with the male coupling B, while the other is connected or provided with a female coupling C, as clearly shown in Figs. 1 and 2.

The portion B is provided with a tubular extension D, which is inserted into the interior of the hose A, while the portion C is provided with a similar extension D, to be inserted into the hose A', but which, instead of being integral with the coupling, is made separate therefrom, so as to permit the nut C' of the female coupling C to turn thereon, as is usual in this class of couplings, to connect the parts B C.

Figure 4:
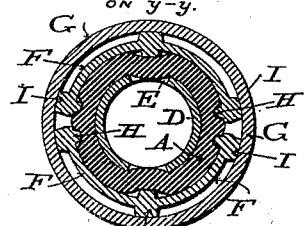
Figure 5:
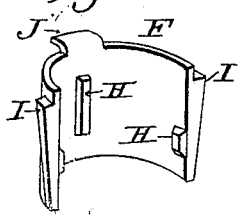
Figure 6:
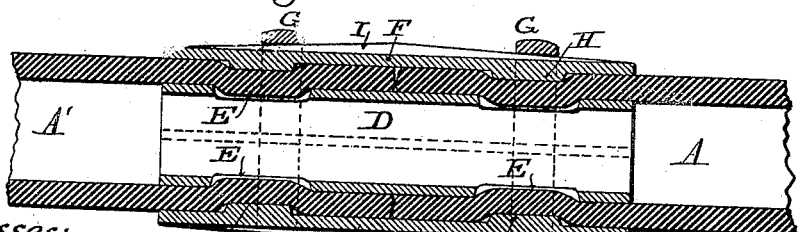

Openings E (one or more in number) are made through the walls of the tubular extensions D, as shown in Figs. 2, 4, and 6, into which the hose is pressed by means hereinafter described, thereby preventing the hose from being pulled off the tubes D of the couplings. In order to thus press the hose into these openings and to cause it to adhere with force to the tubes D, a series of plates F are employed, which are held in place by rings G, as shown. These plates are attached to or connected with the couplings B and C; but inasmuch as the latter turn relatively to each other and one to its tube it is necessary to vary slightly the form of connection between them and the plates. The plates F, under both arrangements, are curved on the arc of a circle and are provided on their inner faces with lugs H, Figs. 2, 4, and 5, which press the hose into the openings E and effectually prevent the hose from being pulled off the tubes D.

While in the drawings I have shown the tube as provided with two openings, I do not wish to be understood as limiting myself to that number. The number of lugs will usually correspond to the number of openings.

On their outer faces the plates are provided with inclined, tapering, or wedge-shaped ribs I, which extend lengthwise of the plates and taper or incline upward from their outer ends inward toward the center of the couplings. The plates are each further provided with a curved lug or hook J, which engages with the collars B' C' of the couplings B C.

In the case of the male coupling B, which does not turn relatively to the hose, these lugs or hooks J merely pass through eyes or perforations K therein; but with regard to the female coupling, the nut C' of which must turn, these lugs merely engage in an undercut groove L in the rotatable collar, as shown in Fig. 2. Now, in order to clamp the plates firmly in place, I employ rings G, which encircle the plates F and bear upon the ribs I thereof, as shown in Figs. 1, 2, and 4, and from this arrangement it will be seen that as the rings are driven up the inclined faces of the ribs the plates will be forced closely into contact with the hose, and the latter in turn forced firmly and tightly against the tubes D. It is found in actual use that the parts adhere so firmly as to effectually prevent the hose from being disconnected from or pulled off its tubes.

The rings G may be made tapering or conical on their inner faces if desired; but while this is preferable, such construction is not essential or necessary.

It is obvious that the invention may be applied to joints or connections which do not have the male and female couplings B C, but which have in lieu thereof a single integral tube D, which is to all intents and purposes the equivalent of the tubes D D of the couplings B C. Such an arrangement as this is shown in Fig. 6, upon reference to which it will be seen that instead of having two separate sets of plates F a set of two or more is employed. These plates are provided with the lugs H to press the hose into the openings F in the tube D, and are also provided with the ribs I on the outer face. In this arrangement the ribs taper or increase in size from the ends toward the center and are adapted to receive rings G, as in the plans illustrated in the other figures.

Various modifications will readily suggest themselves, which will, however, involve no departure from the spirit of my invention. For instance, the form and number of the lugs on the inner face of the plates F may be varied, while the ribs on the outer face of said plates may likewise be varied in number and in form.

The parts may be made of maleable cast-iron, brass, or any other suitable metals, and their construction is such as to require no accurate or expert fitting or finishing of the parts. In this latter particular the present invention differs from those constructions in which threaded conical rings are employed in connection with similarly-threaded collars or sleeves.

The latter arrangement is quite expensive and impracticable, and has not come into use, so far as I am aware.

Under the present invention the rings may be driven to place without the aid of any special tools or appliances, thus enabling the user to repair the hose or connect its parts or sections without the aid of such special devices.

The nut or collar C' of the female coupling C and the collar B' of the male coupling B will advisably, though not necessarily, be made larger in diameter than the rings G, so that when the hose is dragged along it will rest upon these collars B' C'.

Various features of the present invention are capable of, though not designed for, separate and independent use, and hence I do not wish to be understood as restricting the invention to the exact combination shown.

I am aware that a hose-coupling has been devised in which a series of spring-arms riveted to a ring is adapted to be compressed upon the hose by means of an encompassing ring, and to bear upon the hose at one end only, and to such construction I lay no claim.

Having thus described my invention, what I claim is—

1. In a hose-coupling, the combination, with a tube D, adapted to be inserted into the hose, of the removable independent plates F, having external bearing-faces inclined upward from each end toward the center of the coupling and adapted to bear throughout their length upon the hose, and plain rings G encircling the inclined bearing-faces, all substantially as shown and described.

2. In a hose-coupling, the combination, with tube D, having openings E in its walls and adapted to be inserted into the hose, of plates F, provided on their inner faces with lugs H, directly over the openings E, and with inclined ribs on their outer faces, and rings G encircling the plates and adapted to force the hose into the openings, as and for the purpose set forth.

3. In combination with tube D, provided with openings E, hose A, plates F, provided with lugs H over the openings E, and with similar lugs to one side of the openings, inclined bearing-faces on the outer face of the plates, and rings G encircling the plates, all substantially as shown.

4. In combination with the couplings B C, having tubes D, hose-sections A A', separate independent plates F, secured to the couplings B C, and provided with external inclined bearing-faces, and rings G encircling the plates.

5. In combination with the male coupling B, having a tube D, plates F, each provided with a hook J, to engage the coupling, and a ring G encircling the plates.

6. In combination with couplings C, having a loose collar, and a tube D, plates F, engaging with the loose collar, and a ring G encircling the plates.

7. In combination with coupling C, having tube D and a loose collar, a groove in said collar, plates F, provided with a hook J, to engage the groove, and a ring G encircling the plates.

8. The hose-coupling herein described, comprising the following elements, to wit: a male coupling B, provided with a tube D, to be inserted into the interior of the hose and provided with openings E, female coupling C, provided with tube D, having openings E, and also provided with a loose collar or nut to engage the male coupling, plates F, secured to the couplings B C, and provided on their inner and outer faces, respectively, with lugs H and ribs I, and rings G encircling the plates, all substantially as shown.

In witness whereof I hereunto set my hand in the presence of two witnesses.

SAMUEL WILSON RAVENEL.

Witnesses:
WM. J. MCCARTHY,
STANLEY PLANT.